United States Patent [19]

Kondo et al.

[11] Patent Number: 5,103,151
[45] Date of Patent: Apr. 7, 1992

[54] METHOD FOR DRIVING A STEPPING MOTOR

[75] Inventors: Yasuhiro Kondo, Hirakata; Satoshi Kawamura, Katano, both of Japan

[73] Assignee: Matsushita Electric Industrial Co., Ltd., Kadoma, Japan

[21] Appl. No.: 508,347

[22] Filed: Apr. 13, 1990

[30] Foreign Application Priority Data

Apr. 14, 1989 [JP] Japan .................................. 1-95721

[51] Int. Cl.⁵ .............................................. H02P 8/00
[52] U.S. Cl. ...................................... 318/696; 318/685
[58] Field of Search .............................. 318/696, 685

[56] References Cited

U.S. PATENT DOCUMENTS

| | | | |
|---|---|---|---|
| 4,480,218 | 10/1984 | Hair | 318/696 |
| 4,658,194 | 4/1987 | Richter et al. | 318/696 |
| 4,904,917 | 2/1990 | Hakluytt | 318/696 |

*Primary Examiner*—William M. Shoop, Jr.
*Assistant Examiner*—Saul M. Bergmann
*Attorney, Agent, or Firm*—Cushman, Darby & Cushman

[57] ABSTRACT

In a stepping motor having a plurality of phase windings, a phase-angle range of an electrifying signal for each of the phase windings is made smaller than 180°, and a counterelectromotive voltage generated in each of the phase windings is detected during an off time of the electrifying signal, to realize a closed-loop driving.

12 Claims, 12 Drawing Sheets

METHOD FOR DRIVING A STEPPING MOTOR

FIELD OF THE INVENTION AND RELATED ART STATEMENT

1. Field of the Invention

The present invention relates to a method for driving a stepping motor with feedback control therefor.

2. Description of the Related Art

In recent years, with the spread of microcomputers, opportunities for using a stepping motor have increased. Hereafter, a conventional method for driving the stepping motor is described.

Figure 9:
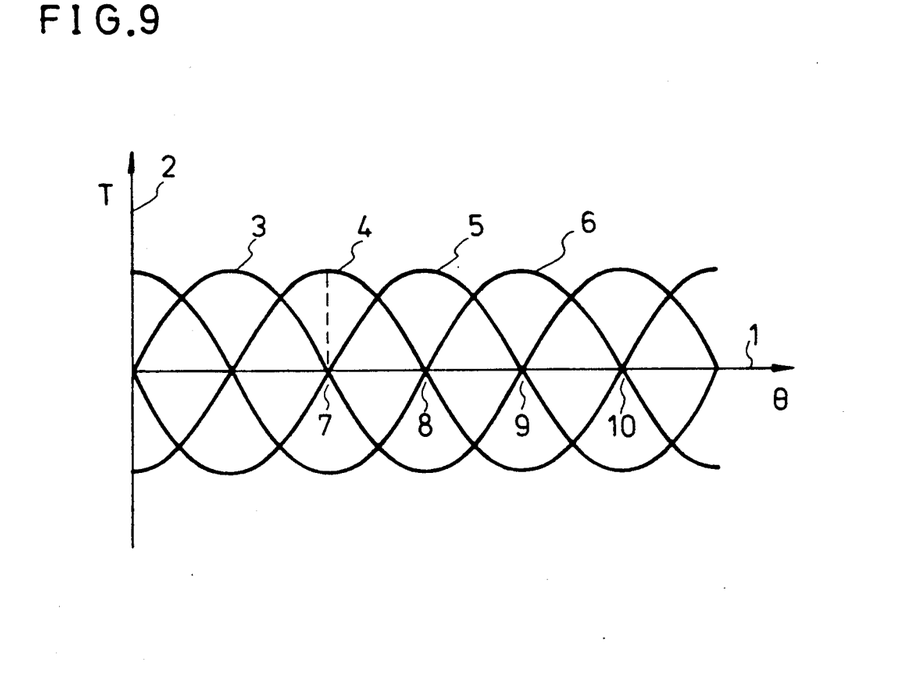
FIG. 9 is a graph showing torque curves of the stepping motor.

FIG. 9 is a graph showing torque curves of the stepping motor in a specific excitation method. The abscissa 1 is graduated by angle 0, and the ordinate 2 is graduated by torque T. Torque curves 3, 4, 5 and 6 are obtained when respective phases of the stepping motor are excited.

As an example, description will be made with regard to a conventional two-phase excitation method for a four-phase stepping motor. In FIG. 9, when a first phase and a second phase are excited, a torque curve 3 is obtained. Also, when the second phase and a third phase are excited, a torque curve 4 is obtained. Further, a torque curve 5 is obtained by exciting the third phase and a fourth phase, and a torque curve 6 is obtained by exciting the fourth phase and the first phase. Clockwise torque is generated when the curves 3, 4, 5 and 6 take values above the abscissa 1 (above zero), and a counter-clockwise torque is generated when the curves 3, 4, 5 and 6 take values below the abscissa 1.

Herein, clockwise rotation is described. When the first phase and the second phase are excited, the torque curve 3 is generated, and a rotor (not shown) rotates and thereafter stops at an angular position 7. At that time, when the second phase and the third phase are excited, the torque curve 4 is generated in place of the torque curve 3. Then, since clockwise torque is generated again in the rotor at the angular position 7, the rotor rotates and thereafter stops at an angular position 8. By repeating the above-mentioned operation, the rotor sequentially makes rotational movements.

Figure 10:
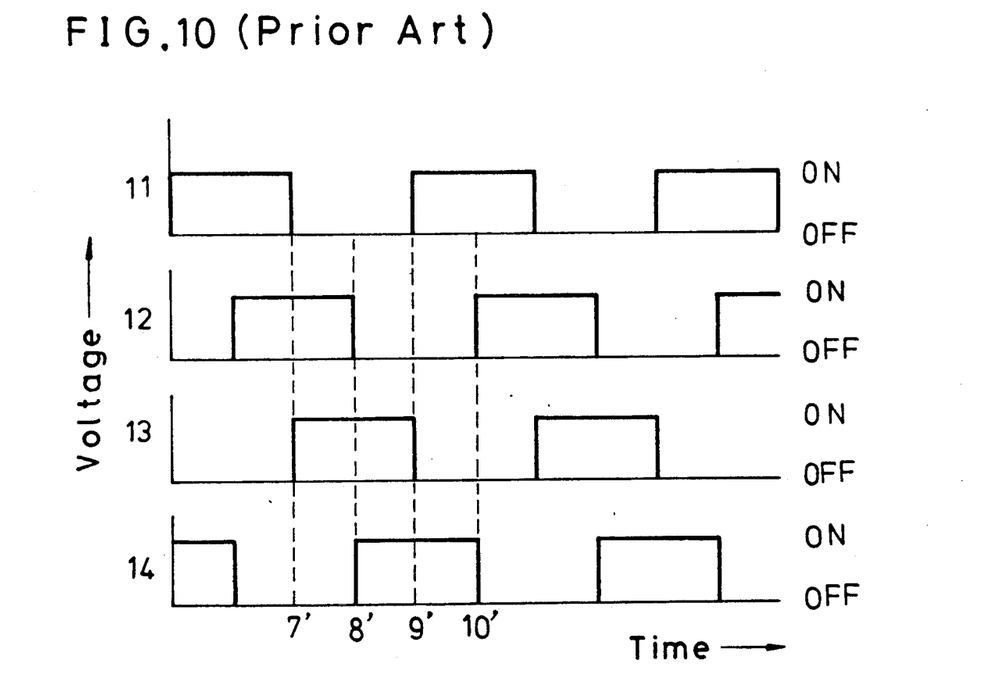
FIG. 10 is a graph showing the conventional exciting signals for the stepping motor.

FIG. 10 is a graph showing the foregoing exciting method. Excitation signals 11, 12, 13 and 14 are for the first phase, the second phase, the third phase and the fourth phase, respectively. Times of four points 7', 8', 9' and 10' correspond to the angular positions 7, 8, 9 and 10 in FIG. 9, respectively.

In general, methods for driving a stepping motor are classified into two types. One is an open-loop driving method such that a position signal of the rotor in the stepping motor is not fed back. The other is a closed-loop driving method such that the position signal of the rotor is fed back through a rotary encoder.

First, the open-loop driving method, which is the most popular method, is described. One of the most remarkable features of the stepping motor is that positioning and constant-speed control are carried out by the open-loop driving method. Each of the excitation signals 11, 12, 13 and 14 (FIG. 10) is generated by a microcomputer etc. and is supplied as a switching signal to a power-electronics component. When the rotor has reached the angular position 7, 8, 9 or 10 (the times 7', 8', 9' or 10' when the rotor reaches the angular position 7, 8, 9 or 10, respectively) before receipt of the next excitation signal, rotation of the stepping motor is free of stepping errors. At that time, since the rotor makes a rotation synchronized with the switching signals which are generated by the microcomputer etc., constant-speed control is realized.

Figure 11:
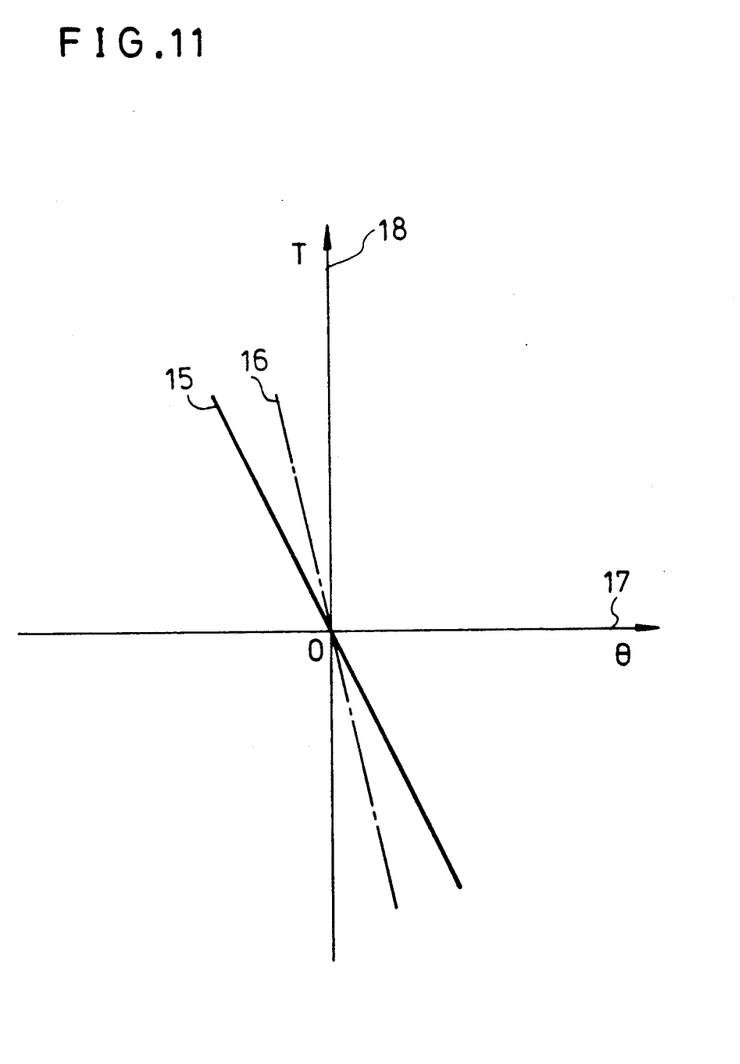
FIG. 11 is a graph showing a stiffness characteristic of the stepping motor.

When the excitation is fixed in a specific state, the rotor halts at a position which corresponds to any of the angular position 7, 8, 9 or 10 in FIG. 9. It is thereby possible to make positioning control open-loop. The rotor has a stiffness characteristic (the ability top resist deviations resulting from loading at the output), and this stiffness characteristic is controlled by an input voltage and an input current. This stiffness characteristic is shown in FIG. 11; the abscissa 17 represents the angular position $\theta$ of the rotor, and a point "0" corresponds to each of the angular positions 7, 8, 9 and 10 in FIG. 9. The ordinate 18 represents a torque T generated in the rotor. A torque curve 15 or 16 (the stiffness characteristic) is a part of the torque curve 3, 4, 5 or 6 in a nearby angular range to each angular position 7, 8, 9 or 10 in FIG. 9. The stiffness characteristic 16 is obtained under the condition of a higher voltage and a larger current than those of the stiffness characteristic 15.

Figure 12:
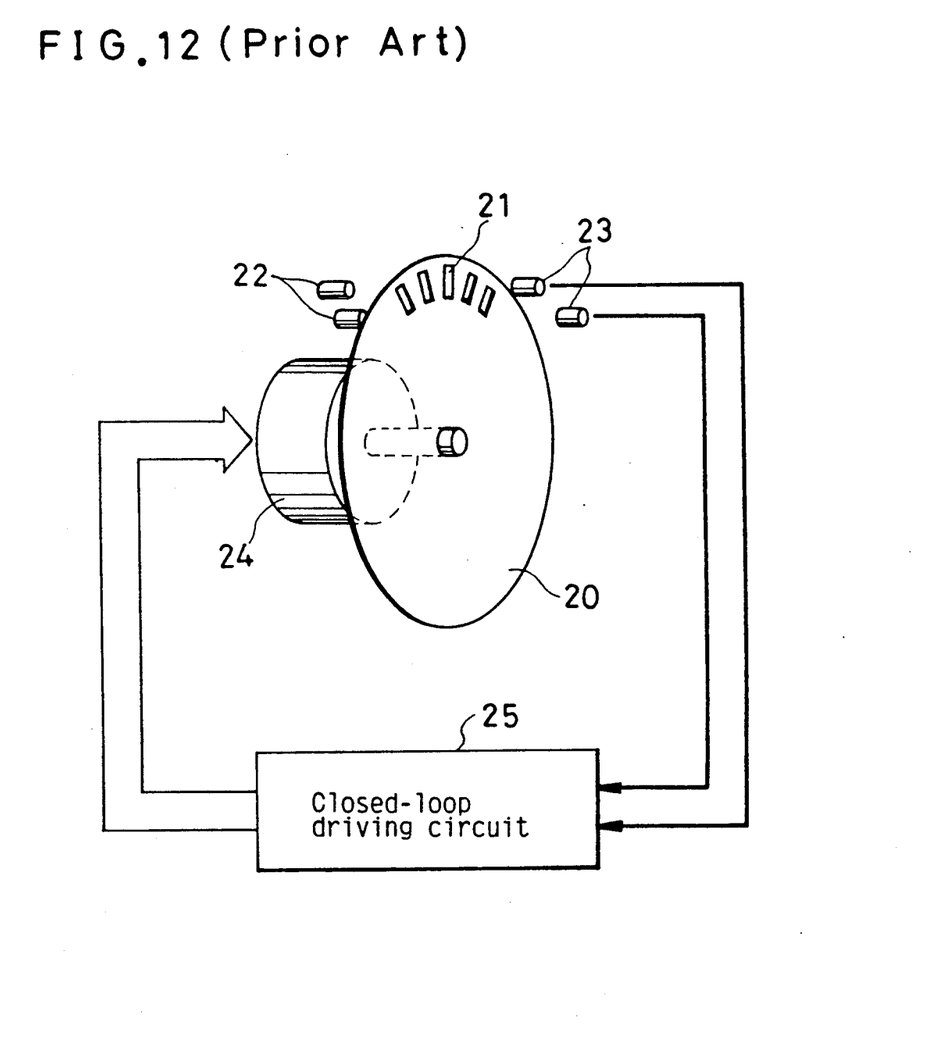
FIG. 12 is an illustration showing the closed-loop driving method for the stepping motor.
Figure 13:
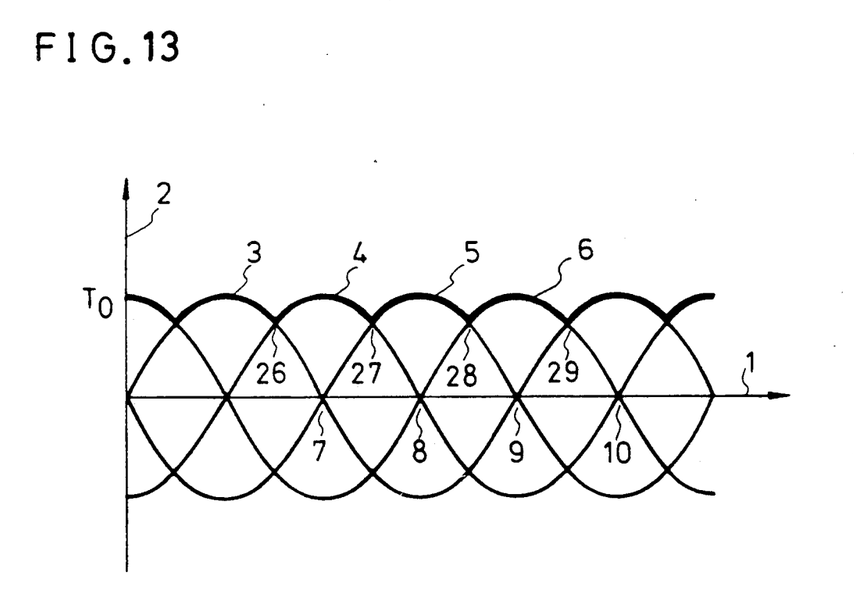
FIG. 13 is a graph showing torque curves of the stepping motor.

Next, the closed-loop driving method is described. The closed-loop driving method is carried out by the following procedure. That is, the position of the rotor is detected by e.g. an encoder, and excitations of the respective phases are changed in response to the detected position signals. The rotor is thus rotated. FIG. 12 is an illustration showing the closed-loop driving method. An encoder disk 20, which is rotated by a stepping motor 24, has plural slits 21. Light emitting elements 22 and light receiving elements 23 are disposed to oppose to each other, and signals issued from the light receiving elements 23 are supplied to a closed-loop driving circuit 25. The stepping motor 24 is driven by the closed-loop driving circuit 25. FIG. 13 is a graph showing torque curves of the stepping motor 24 and is similar to the graph of FIG. 9. Points 26, 27, 28 and 29 are intersections of adjacent pairs of the torque curves 3, 4, 5 and 6 in a region where the clockwise torque is generated.

When the positional relation between a still position of the rotor and the slits 21 of the encoder is specifically defined, the position of the rotor is detected by the output signals of the encoder. By selecting the positional relation between the rotor and the slits, a change of excitation can be carried out at a desired angular position. The angular positions 7, 8, 9 and 10 in FIG. 13 are selected as change-over points. For instance, in case the first phase and the second phase are excited, when the rotational position of the rotor arrives at the still position 7, the arrival is detected by the encoder. Upon detection, excitation is changed from the first and second phases to the second and third phases, respectively. At that time, the torque curve 4 becomes on duty in place of the torque curve 3. Therefore, the maximum starting torque $T_0$ is generated at the changei-over point 7. On the other hand, when change of excitation is carried out at the points 26, 27, 28 and 29 of intersection, the torque curve follows the maximum positions of the respective torque curves 3, 4, 5 and 6 as shown by a corrugated hold curve in FIG. 13.

In the above-mentioned description about the change of excitation and the torque curve, consideration of the time factor is omitted. In the actual stepping motor, since windings of the stepping motor have an inductance, a transient time-lag from the change-over of excitation to the build-up of current is generated. As a result, torque is generated with the time-lag. In view of this time lag, when the stepping motor is driven at high speed, the change-over points of excitation are generally advanced by a predetermined phase angle, which is called a lead angle, before the angular poistions 7, 8, 9, 10, 26, 27, 28 and 29.

In the above-mentioned conventional driving method, however, the only way for reducing cost is to employ the open-loop driving method. In the open-loop driving, since the exciting phase is changed without regard to the position of the rotor, the "out of step" condition often occurs. Also, change-over of excitation is not always carried out at an optimum point of the torque curve. Thus, the open-loop driving method is not satisfactory for obtaining a desirable characteristics. From a design standpoint, this aspect of open loop operation results in such a need that the motor having a sufficient and excessive torque has to be selected in view of changes of load and power supply. As a result, the big motor has been selected, and its cost has been high. Further, provision of the excessive torque causes undesirable vibration or noise when the load of the motor is light during normal driving condition.

On the other hand, the closed-loop driving method has no problems regarding, vibration and noise. However, since a position sensor of e.g. an encoder is needed to dectect the position of the rotor, a total cost is high and the size of apparatus becomes large.

OBJECT AND SUMMARY OF THE INVENTION

An object of the present invention is to offer a closed-loop driving method for a stepping motor without any position sensor for the rotor.

In order to achieve the above-mentioned object, a method of the present invention for driving a stepping motor having a plurality of phase windings is characterized in that:

a phase-angle range of an electrifying signal for each of the phase windings is smaller than 180°.

Since this method creates an off-time period during which a counterelectromotive voltage generated in each of the phase windings can be detected in the off time, thereby enabling an optimum selection of an electrifying timing and its duration. Therefore, the closed-loop driving of the stepping motor is realized without the position sensor for the rotor. Further, it is possible to rotate and stop the rotor in synchronism with an external command.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, preferred embodiments of the present invention are described with reference to the accompanying drawings.

Figure 1:
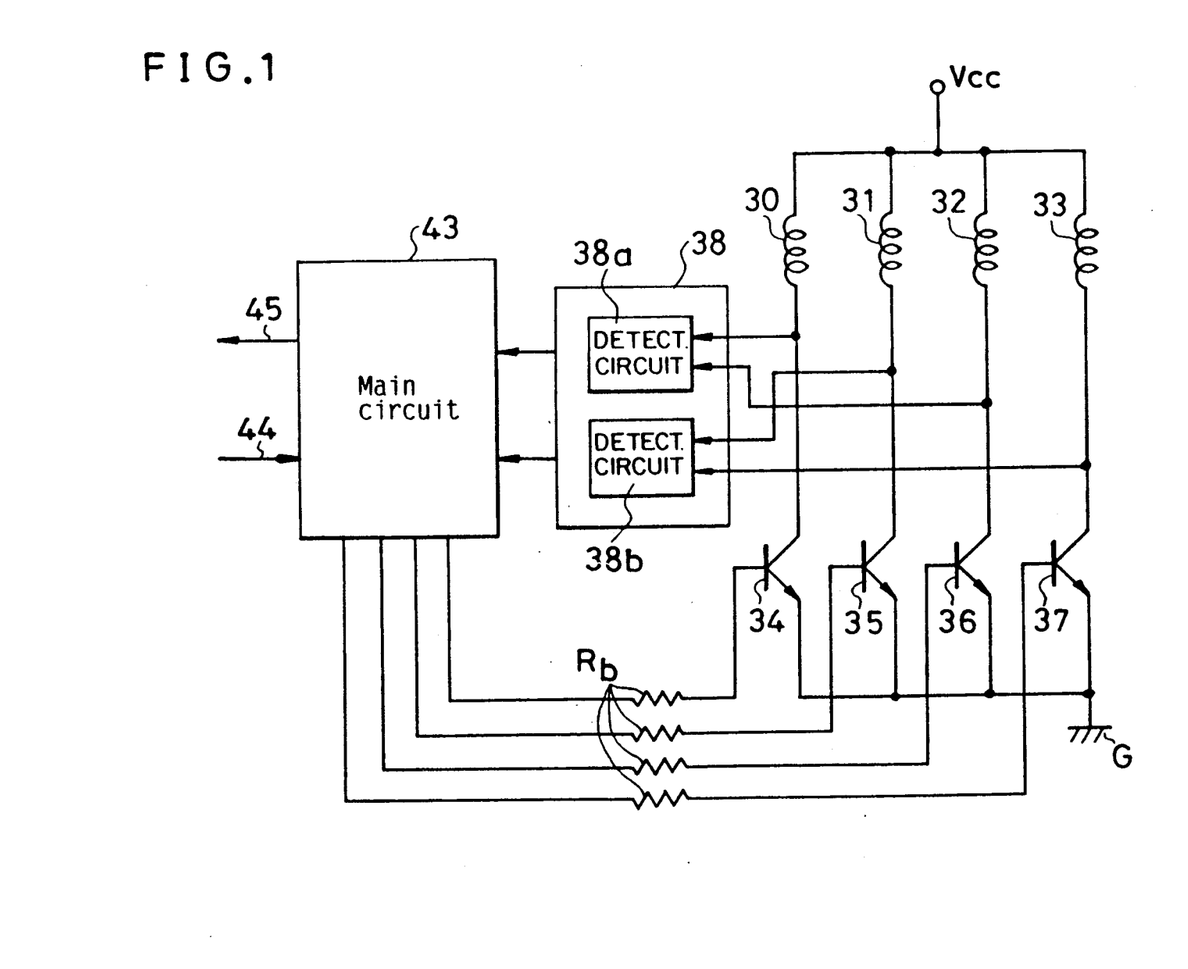
FIG. 1 is a circuit diagram showing a main part of a stepping motor and its driving circuit which are used in the present invention.

FIG. 1 is a circuit diagram showing a main part of the stepping motor and its driving circuit. A first phase winding 30, a second phase winding 31, a third phase winding 32 and a fourth phase winding 33 are connected in series with switching elements 34, 35, 36 and 37, respectively. A counterelectromotive voltage detection circuit 38 is provided to detect a counterelectromotive voltage of each phase winding and has a pair of detection circuits 38a and 38b. The detection circuit 38a receives voltage signals from the first phase winding 30 and the third phase winding 32, and the detection circuit 38b receives voltage signals from the second phase winding 31 and the fourth phase winding 33. A main circuit 43 receives output signals from the counterelectromotive voltage detection circuit 38 and controls switching states of the switching elements 34-37 via resistors $R_b$. Further, the main circuit 43 receives a command signal 44 from the external and issues an output signal 45 to the external.

Figure 2:
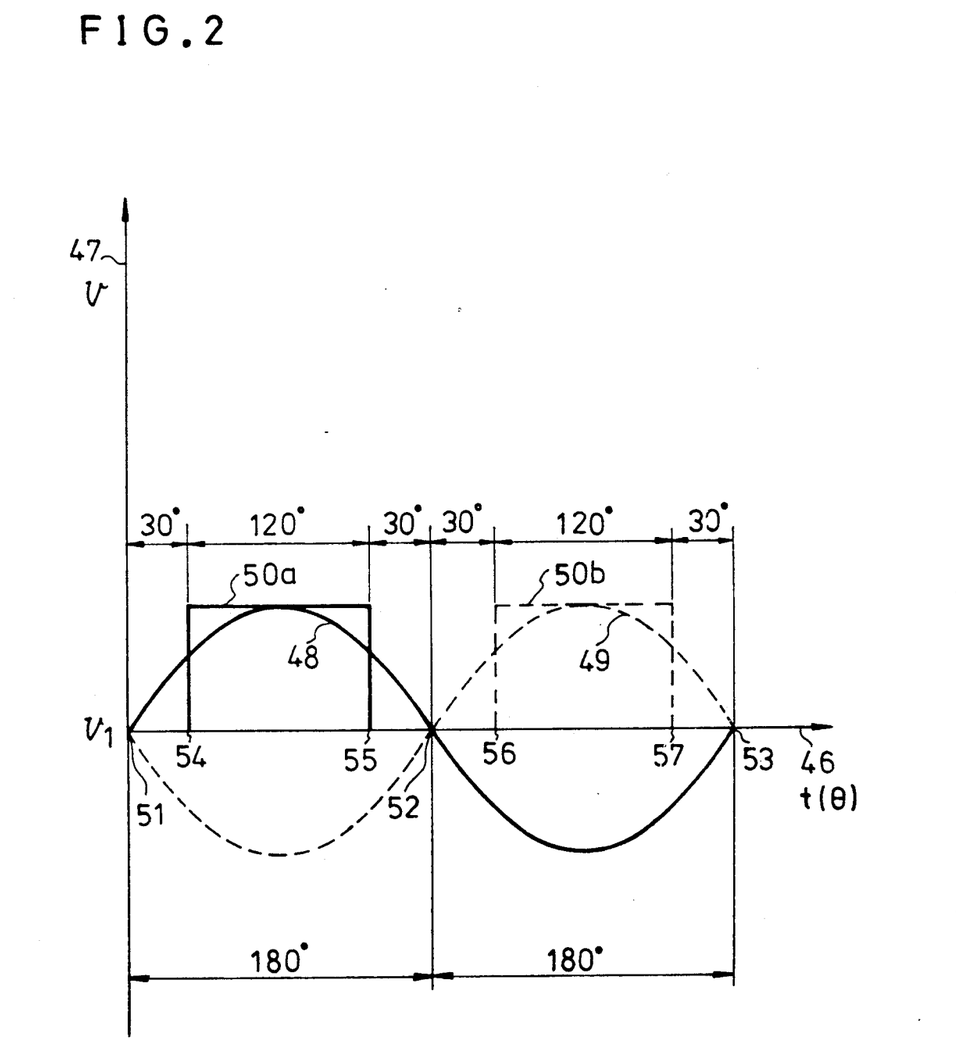
FIG. 2 is a graph showing an operational principle of the present invention.

FIG. 2 is a graph showing an operational principle of the present invention. A time axis 46 corresponds to an angular position $\theta$ of the stepping motor. The ordinate 47 is graduated by voltage V. A solid curve 48 represents a counterelectromotive voltage generated in the first phase winding 30 (FIG. 1), and a dotted curve 49 represents a counterelectromotive voltage generated in the third phase winding 32 (FIG. 1). The first phase winding 30 is electrified by a solid rectangular waveform 50a, and the third phase winding 32 is electified by a dotted rectangular waveform 50b. In a permanent magnet type stepping motor, the counterelectromotive voltage shown in FIG. 2 is generated in each phase winding. When generated force obtained by excitation of each phase winding is defined as "f"; the counterelectromotive voltage of each phase winding is defined as "e"; excitation current of each phase is defined as "i"; and velocity of the rotor is defined as "v", the following relation is obtained:

$$f = -ei/v \qquad (1).$$

Accordingly, when a sine wave having the same phase as that of the counterelectromotive voltage is applied to each phase winding, the force f is obtained in accordance with the relation (1). As a method for simulating the sine wave, the rectangular waveforms 50a and 50b can be used instead of the sine wave. An electrifying time period of each of the rectangular waves 50a and 50b is smaller than 180° in phase angle: for example, it is 120° as shown in FIG. 2. An electrifying-off-time of 30° is thereby made between a point of intersection (hereinafter is simply referred to as an intersection) 51 (of the curve 48 with the time axis 46) and a starting point 54 of the rectangular waveform 50a, and also another off-time of 30° is made between an end point 55 of the rectangular waveform 50a and another intersection 52. As to the third phase, the electrifying-off-time of 30° is made in the similar way as aforementioned. Therefore, there exists the electrifying-off-time of 30° on opposite sides of the intersection e.g. 52. In this total off-time of 60°, the counterelectromotive voltages of the first and third phases can be observed.

In practical use, it is the first to detect the intersection 51 of the counterelectromotive voltage curve 48 on the time axis 46, and thereafter electrification of the first phase winding starts at the point 54 with the time lag of 30° from the intersection 51. Further, the electrification ceases at the point 55 where the time lag from the intersection 51 is 150°. Excitation of the stepping motor is thus changed at the point where torque is efficiently generated in accordance with rotation of the rotor.

Next, a method for detecting these intersections 51, 52 and so on and a method for recognizing both the starting point (e.g. 30°) and the ceasing point (e.g. 150°) of electrification are described. In FIG. 2, the intersections 51, 52, ... on the time axis 46 are the intersections of the counterelectromotive voltage curves 48 and 49. In other words, at the intersections 51, 52 and so on, the counterelectromotive voltages of the respective curves 48 and 49 are equal to each other. In a practically used stepping motor with the first and third phases of bifilar winding, the first phase winding and the third phase winding are arranged in reverse polarities to each other. Therefore, the counterelectromotive voltage curves 48 and 49 are generated with a phase difference of just 180° from each other as shown in FIG. 2. In summary, the intersections 51, 52, ... are determined by comparing the voltage of the first phase winding with that of the third phase winding and detecting points of phase angle where voltages of the first phase winding and the third phase winding are coincident with each other. As to the second phase and the fourth phase, both of which are of the bifilar winding, the similar way as aforementioned is applied. That is, the intersections are determined by comparing the counterelectromotive voltage of the second phase with that of the fourth phase, and an electrifying signal is obtained from signals of these intersections.

Figure 3A:
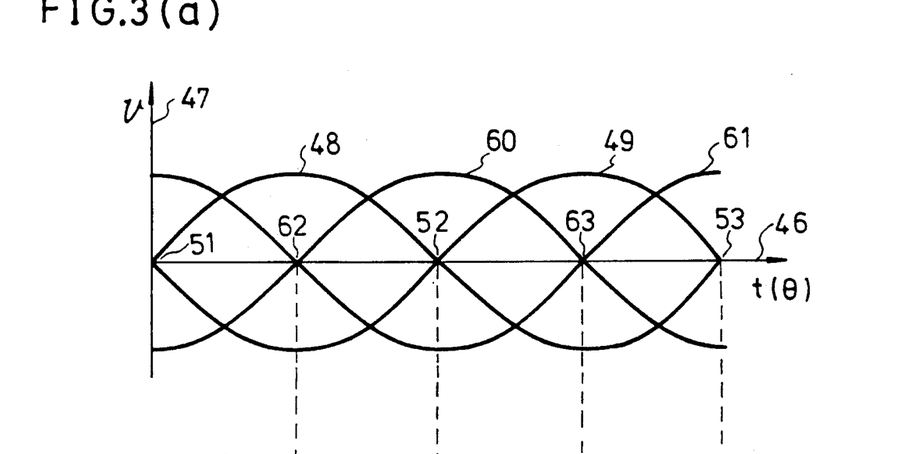
FIGS. 3(a), 3(b), 3(c) and 3(d) are graphs showing a procedure for obtaining an electrifying signal of the present invention.
Figure 3B:
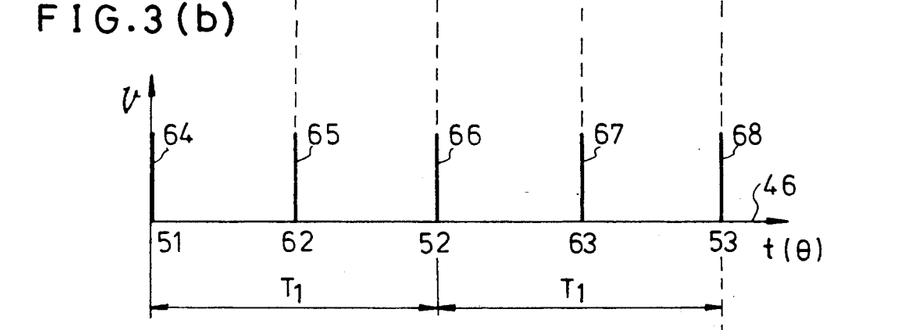
Figure 3C:
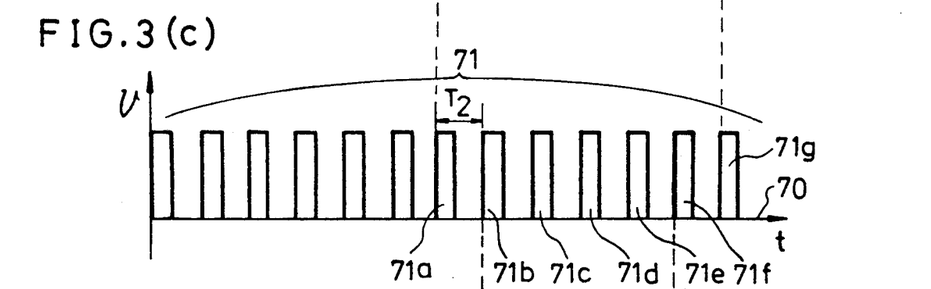
Figure 3D:
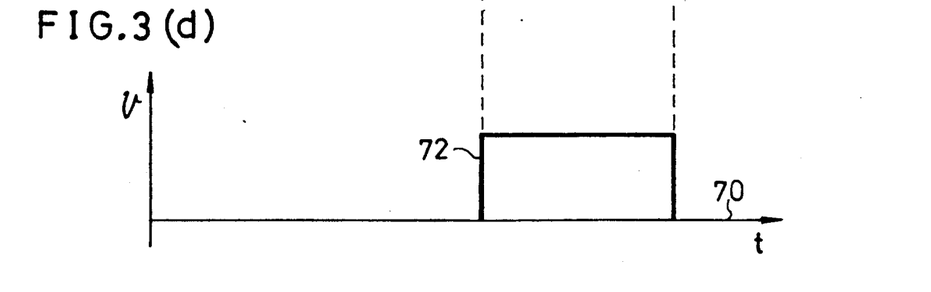

FIGS. 3(a), 3(b), 3(c) and 3(d) are graphs showing a procedure for obtaining the electrifying signal. In FIG. 3(a) and FIG. 3(b), the abscissa is a time axis (phase angle $\theta$) 46, and the ordinate 47 represents voltage V. Curves 48, 60, 49 and 61 represent counterelectromotive voltages which are generated in the first phase winding, the second phase winding, the third phase winding and the fourth phase winding, respectively. At the intersections 51, 62, 52, 63, 53, ... on the time axis 46, these curves 48, 60, 49 and 61 intersect with each other. Signals 64–68 are generated to correspond to the intersections 51, 62, 52, 63 and 53, respectively, and are utilized as reference signals, thereby to determine electrifying signals for the respective phase windings. A time period $T_1$ is of half cycle of each counterelectromotive voltage curve. In FIG. 3(c) and FIG. 3(d), the abscissa is a time axis 70. Rectangular wave signal array 71 consists of plural rectangular wave signals which are generated with a time period $T_2$. This time period $T_2$ holds:

$$T_2 = (1/6n)T_1,$$

wherein n is an integer. That is, the time period $T_2$ is in inverse proportion to the time period $T_1$. For example, in case where n is "1", the rectangular wave signal having the time period $T_2$ (30°) which is one sixth of the time period $T_1$ (180°) is generated at the same time when the signal 66 is generated, and the rectangular wave signal is repeatedly generated six times. During the generation of six rectangular waves 71a, 71b, 71c, 71d, 71e and 71f, an electrifying signal 72 becomes "on" and "off". That is, the signal 72 rises when the rectangular wave signal 71b rises, and the signal 72 falls when the rectangular wave signal 71f rises. Therefore, the electrifying signal 72 is "on" from 30° to 150° with reference to the intersection 52. The signal 66 is thus relied upon to be the timing signal for electrifying. As to other phases, the electrifying signals can be made in the same way as set forth above.

Hereupon, by detecting a phase error between the rectangular wave signal (e.g. 71g) and the timing signal (e.g. 68), both signals of which should be coincident with each other in the time axis, feedback control is possible to determine the time period $T_2$ of the signal 71 more accurately. Accuracy of the electrifying signal is thereby expected to be improved further.

Figure 4:
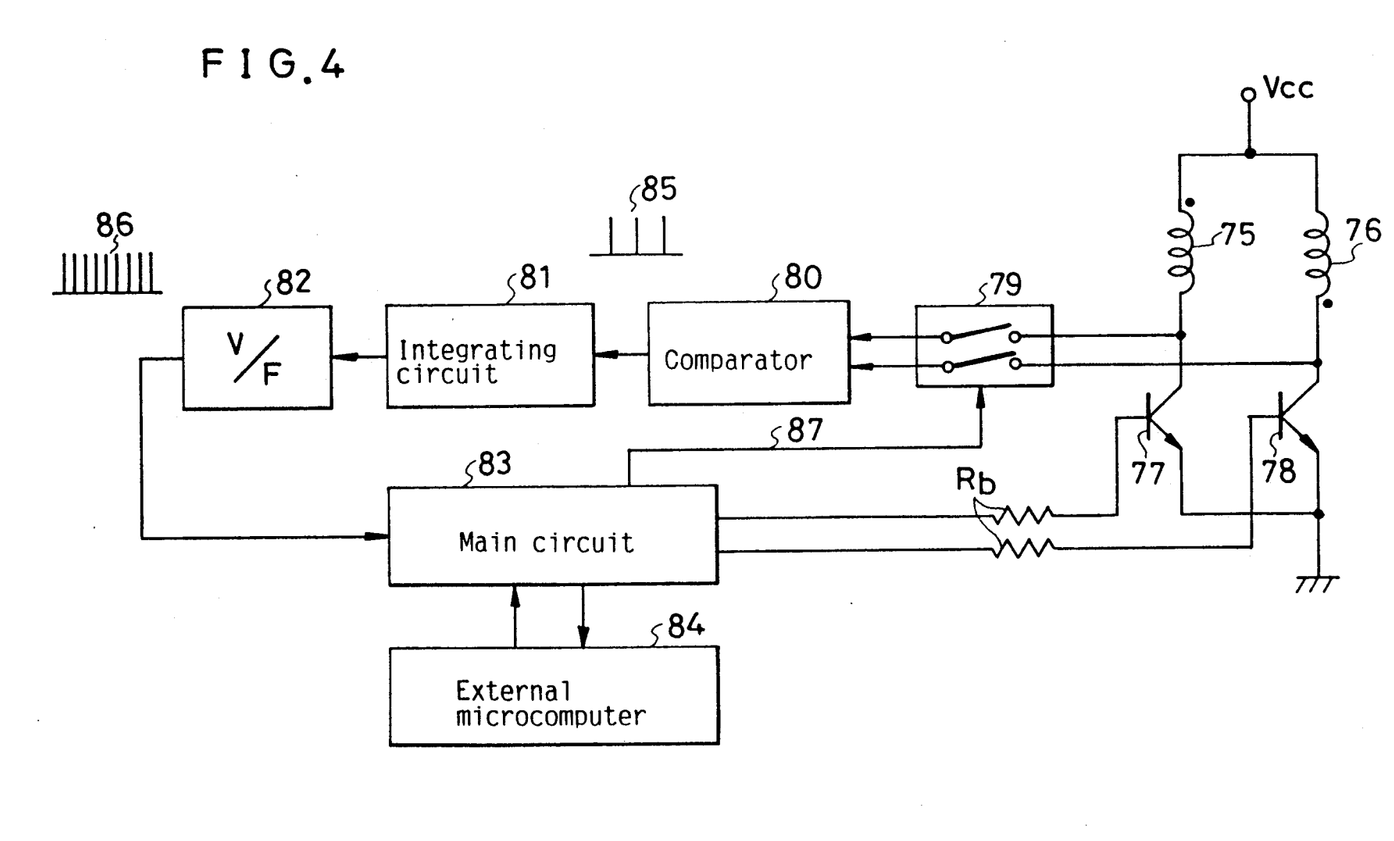
FIG. 4 is a block diagram showing the stepping motor and its control circuit which are used in the present invention.

FIG. 4 is a block diagram showing the stepping motor and its control circuit. A first phase winding 75 is connected with a switching element 77, and a third phase winding 76 is connected with a switching element 78. Both phase windings are of bifilar windings. An analogue switch 79 makes connection between the first and third phase windings 75, 76 and a comparator 80. Operation of the analogue switch 79 is synchronized with an output signal 87 issued from a main circuit 83. The comparator 80 compares voltages inputted thereto and issues an output signal to an integrating circuit 81. The integrating circuit 81 makes a voltage signal in response to a time period of the output signal issued from the comparator 80. A voltage controlled oscillator (V/F) 82 receives the voltage signal from the integrating circuit 81 and issues a frequency signal to the main circuit 83. Each of the switching elements 77 and 78 is controlled by the main circuit 83 through a resistor $R_b$. The main circuit 83 communicates with an external microcomputer 84. Signals 85, which are issued from the comparator 80, correspond to the timing signals 64–68 in FIG. 3(b). Also, signals 86, which are issued from the voltage controlled oscillator 82, correspond to the signal 71 in FIG. 3(c). The signal 86 has a time period of T₁/6.

Figure 5A:
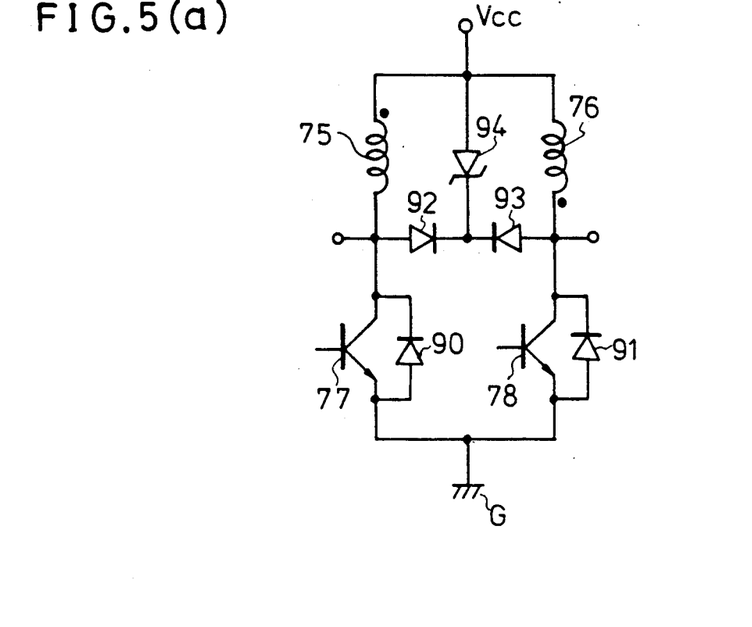
FIG. 5(a) is a circuit diagram showing a part of a driving circuit for the stepping motor having bifilar windings.
Figure 5B:
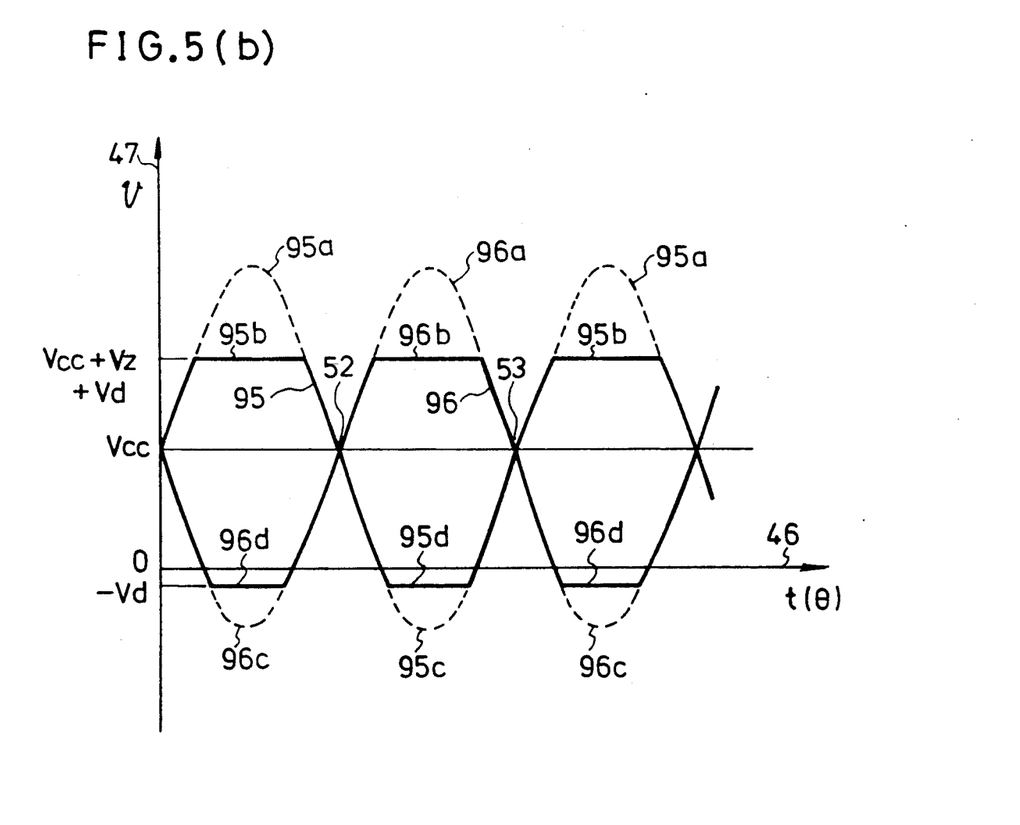
FIG. 5(b) is a graph showing the counterelectromotive voltage waveforms generated in the phase windings 75 and 76 of FIG. 5(a).
Figure 6A:
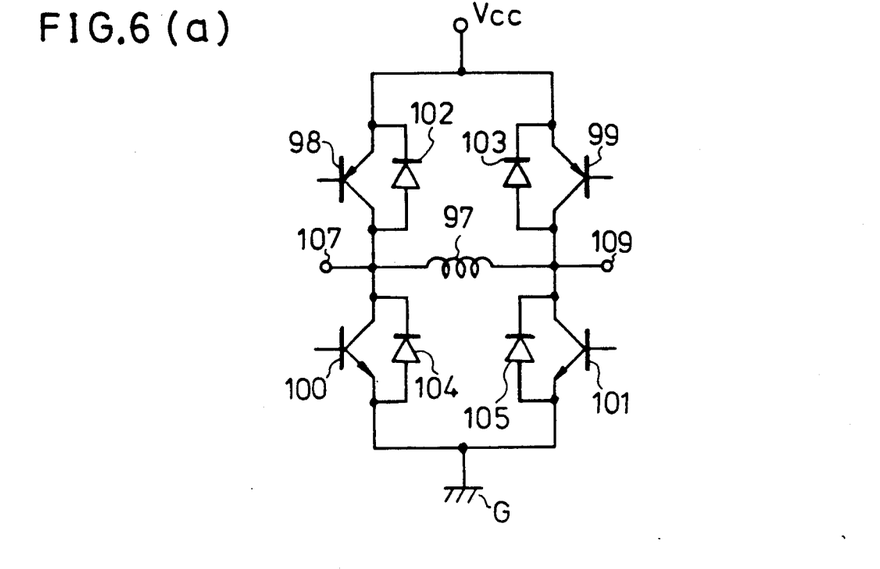
FIG. 6(a) is a circuit diagram showing a part of a bipolar driving circuit for the stepping motor having a monofilar winding.
Figure 6B:
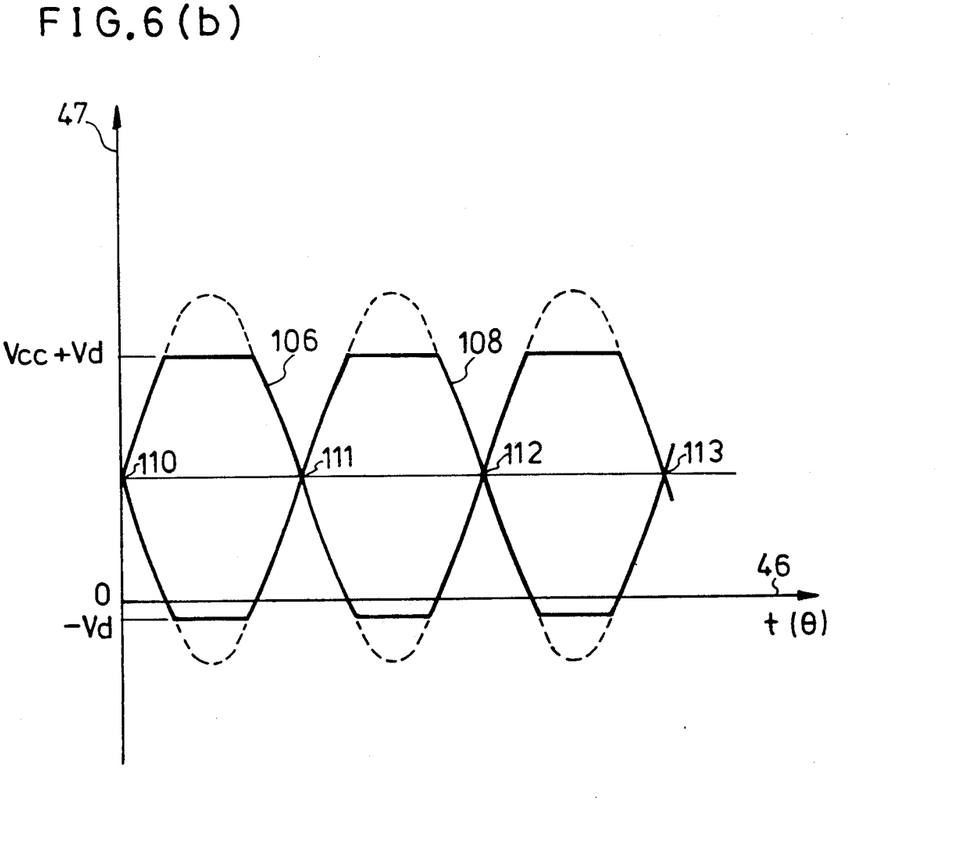
FIG. 6(b) is a graph showing the counterelectromotive voltage waveforms generated in the phase winding 97 of FIG. 6(a).

The above is the description about the operational principle of an embodiment of the present invention. However, in practical use, since protective devices for the switching elements 77 and 78 are used, the actual counterelectromotive voltage waveform is somewhat different from the waveform shown in FIG. 3(a). This is shown in FIGS. 5(b) and 6(b). FIG. 5(a) is a circuit showing a part of a driving circuit for the stepping motor having bifilar windings, and FIG. 5(b) is a graph showing the counterelectromotive voltage waveforms generated in e.g. the first phase winding 75 and the third phase winding 76, both of which are bifilar windings. In FIG. 5(a), the first and third phase windings 75 and 76 are connected with switching elements 77 and 78, respectively. Reverse-bias prevention diodes 90 and 91 are connected in parallel with the switching elements 77 and 78, respectively. Between the first phase winding 75 and the third phase winding 76, a pair of flywheel diodes 92 and 93, which are connected in series and opposite to each other, are connected. Further, a zener diode 94 is provided in order to protect the switching elements 77 and 78 from an overvoltage in their forward directions. In FIG. 5(b), the horizontal is the time axis 46, and the ordinate 47 represents voltage. A curve 95 represents the counterelectromotive voltage generated in the first phase winding 75, and a curve 96 represents the counterelectromotive voltage generated in the third phase winding 76. Although these curves 95 and 96 should be originally sine waves as shown in FIG. 3(a), clamp of voltage occurs as shown by solid lines of FIG. 5(b) owing to the presence of the protection devices 90-94 for the switching elements 77 and 78. That is, a positive peak portion 95a of the curve 95 is clamped at a voltage of (Vcc+Vz+Vd), wherein Vcc is a power source voltage; Vz is a zener voltage of the zener diode 94; Vd is a forward directional voltage of the diode 92, thereby resulting in a waveform shown by the solid line 95b. A negative peak portion 95c of the curve 95 is clamped at a voltage of (−Vd) which is given by a grounding level and the forward directional voltage Vd of the reverse-bias prevention diode 90, thereby resulting in a waveform shown by the curve 95d. As to the other counterelectromotive voltage curve 96, the similar clamps (96b, 96d) to that of the curve 95 are made. However, intersections 52 and 53 of both curves 95 and 96 exist in the same position in the time axis 46 as that shown in FIG. 3(a). Therefore, the operational principle mentioned about FIG. 3(a) can be applied similarly.

Next, an embodiment used in the stepping motor having monofilar windings is described. The monofilar windings are often used in the stepping motor so that both an efficiency of stator windings and an efficiency of the motor per volume thereof are improved. The first phase winding of the above-mentioned bifilar winding and the third phase winding of the same constitute one winding, and also the second phase winding and the fourth phase winding constitute another winding. Hereupon, in the following description, these one and another windings in the bipolar driving are now redefined as a "first phase winding" and a "second phase winding", respectively. FIG. 6(a) is a circuit showing one phase of the bipolar driving circuit only. This circuit consists of a first phase winding 97 of the monofilar winding, four switching elements 98-101 and four diodes 102-105 for protection of the respective switching elements 98-101. FIG. 6(b) is a graph showing counterelectromotive voltage curves 106 and 108 which are obtained from a terminal 107 and the other terminal 109, respectively. These curves 106 and 108 are originally of sine waves and are clamped at the positive and negative peak portions in the same way as that of the aforementioned stepping motor having the bifilar windings. A positive clamp voltage of the driving circuit shown in FIG. 6(a) is a voltage of (Vcc+Vd), and a negative clamp voltage is of (−Vd). When a voltage generated in the winding 97 turns negative from positive, a current, which flows through the winding 97 by means of the counterelectromotive voltages, becomes zero. At that time, potentials of both terminals 107 and 109 are equal to each other. This phenomenon is caused at the time when both curves 106 and 108 make intersections 110, 111, 112, 113 and so on. Based on a time period between the intersections 110-113, feedback control of the stepping motor is realized in the same method as that of the aforementioned stepping motor having the bifilar windings, without any position sensor.

Incidentally, in the actually used circuit, "a phase error", which is analyzed in the transient phenomena, is generated between the counterelectromotive voltage of each winding and the current flown thereby because of presence of inductances in the windings etc. Therefore, in high speed driving, it is necessary for high accuracy control to reduce the above-mentioned phase error.

In the aforementioned embodiments, especially in FIG. 3(d), although the electrifying signal, which has the time lag by 30° from the reference signal (timing signal) and has the electrifying duration of 120°, is obtained by a hardware, such signal may be obtained by a software procedure such that an external microcomputer 84 (FIG. 4) receives only the reference signal and makes the desired electrifying signal in accordance with the predetermined software.

Next, signal-exchanging between the above-mentioned driving system and the external circuit is described. It is the greatest advantage in the stepping motor that the rotational angle and the rotational speed are easily controlled by such an external circuit as the microcomputer.

In the present invention, reliable and efficient driving, which is a feature of the closed-loop control, is realized in addition to the above-mentioned inherent advantage of the stepping motor.

For example, the following method is possible.

In the stepping motor of 1.8° per/step, when an order for making a step advance of 18° is given, a value of 18°/1.8° (=10) is stored in a digital counter. After that, the value is decreased one by one every time the rotor makes one step (1.8°) and generates a signal for changing phase. When the value stored in the counter becomes zero, the step advance of 18° is completed. Furthermore, step-advancing speed of the stepping motor is controlled in response to the present value of the digital counter, thereby realizing special controls such as slow-up, slow-down and so on. For example, by reducing a voltage applied to the stepping motor in response to the present value stored in the counter, it is possible to gradually lower the speed of the stepping motor.

Figure 7:
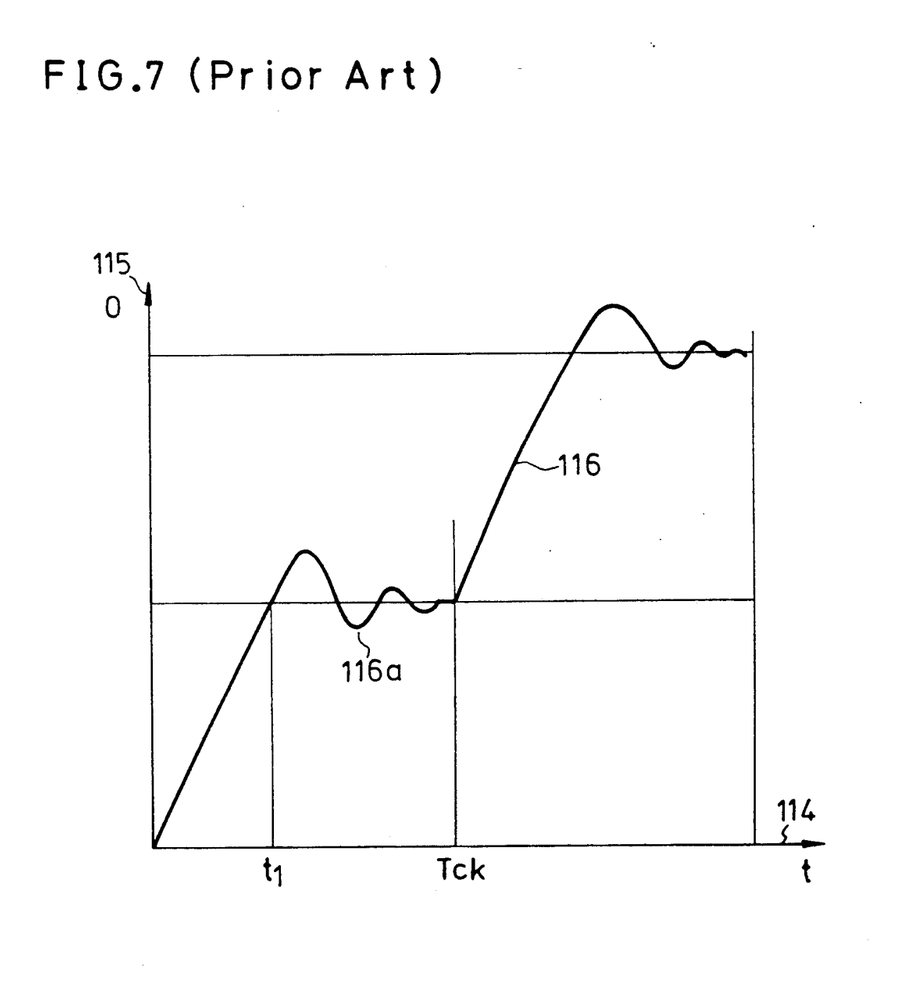
FIG. 7 is a graph showing a locus of the rotor in the stepping motor which is controlled by the conventional driving method.

As mentioned above, the present invention overcomes the shortcomings of the open-loop driving, such as out of step or vibration, and offers the reliable and smooth driving method as if it were of the closed-loop driving with such a position sensor as an encoder. This is described with reference to FIG. 7. The horizontal is a time axis 114 and the vertical is an angular axis 115. A curve 116 represents a locus of the rotor in the stepping motor of the open-loop driving. As aforementioned, it is one feature in the stepping motor that the positioning and constant-speed driving etc. are achieved in the open-loop driving. However, in order to guarantee operation of the stepping motor with sufficient reliability secured against disturbing factors such as lack of uniformity in the load to be driven, lack of uniformity in characteristics of the motor or the drift of temperature in each part, it is required that a rise time $t_1$ of one step angle in the stepping motor is very much smaller than a period Tck of stepping instructions from the external. Then, the rotor makes vibration 116a as shown in FIG. 7 from $t_1$ to Tck, thereby generating noise and vibration toward the external.

Moreover, since the differential time is required between the rise time $t_1$ and the stepping instruction signal period Tck from the external circuit in view of the above-mentioned disturbing factors, driving speed has to be selected to be very much lower than the speed of capable. A driving method of the present invention realizes to grasp the step-advance of the stepping motor without using the position sensor, such as the encoder, thereby establishing very reliable, silent and high speed driving method.

Further, in the conventional driving method of the stepping motor shown in FIG. 9, when the rotor reaches each of the still positions 7-10, the excitation curve is changed to the next one. At that time, in the generated torque of each phase, the relation of the equation (1) is not always held. This means that there is a region where braking torque is generated. In the present invention, such braking torque is avoidable by the electrification for a period less than 180°, thereby realizing an excellent output efficiency per input.

Next, a method for making synchronized rotation speed with the external circuit and a method for stopping the rotor at a desired rotational position are described.

Figure 8A:
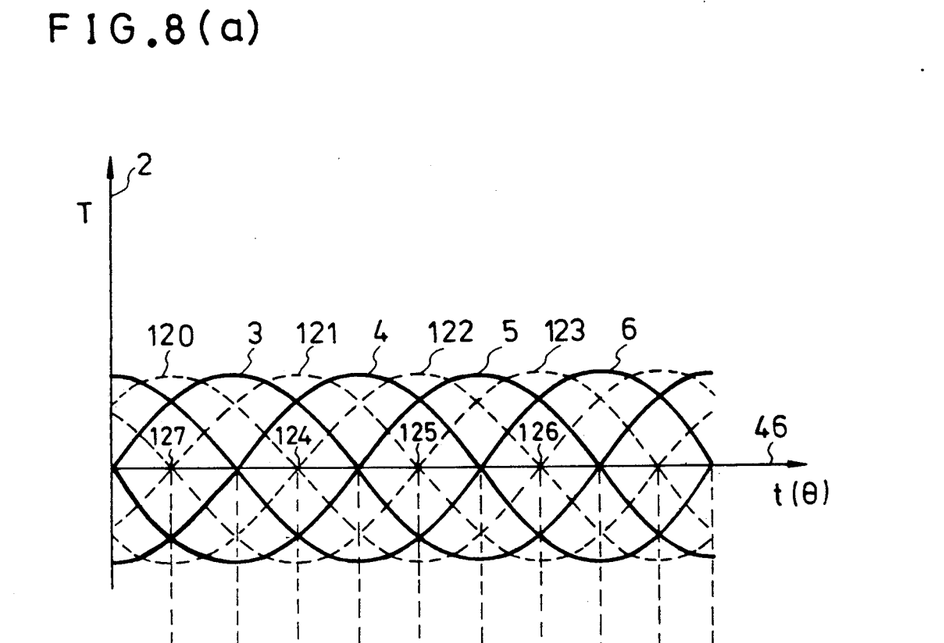
FIG. 8(a) is a graph showing torque curves in the present invention.

FIG. 8(a) is a graph showing torque curves. The abscissa is the time axis 46 which is equivalent to the rotational angle $\theta$ of the rotor. The ordinate 2 represents torque T which is to be generated in the rotor. A torque curve 3 is obtained by exciting the first phase winding and the second phase winding; a torque curve 4 is obtained by exciting the second phase winding and the third phase winding; a torque curve 5 is obtained by exciting the third phase winding and the fourth phase winding; further, a torque curve 6 is obtained by exciting the fourth phase winding and the first phase winding. Torque curves 120, 121, 122 and 123 are obtained only by exciting the first phase winding, the second phase winding, the third phase winding and the fourth phase winding, respectively. In strict, there may be a difference of peak values between the torque curves 3-6 of the two-phases excitation and the torque curves 120-123 of the signal-phase excitation. However, for simplicity and clarity of description, these curves are illustrated to have the same waveforms one another.

Figure 8B:
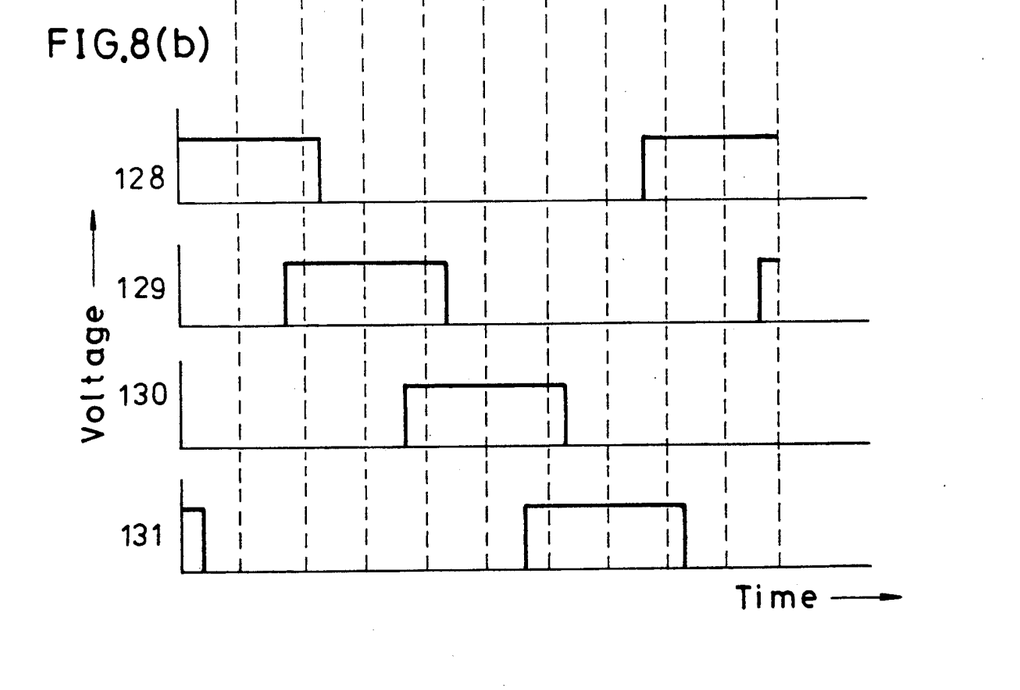
FIG. 8(b) is a graph showing elecrifying signals 128-131 for a four-phase stepping motor used in the present invention.

According to the driving method of the present invention, exchange of excitation is carried out in response to the arrival at intersections 124-127 for determining the timing of electrification in case the two-phases excitation is employed. FIG. 8(b) is a graph showing electrifying signals 128, 129, 130 and 131 for the first phase winding, the second phase winding, the third phase winding and the fourth phase winding, respectively. Electrifying timing of these signals 128, 129, 130 and 131 are determined in accordance with the timings of intersections 126, 127, 124 and 125, respectively.

Hereafter, procedure of making step advance of the rotor with the step signal inputted from the external is described. In case the motor reach the timing of the intersection 124, thereby generating the timing signal for electrification, when none of the next step signal is inputted from the external, ordinary exchange of the torque curve from the curve 3 to the curve 4 is not carried out. Instead, excitation by the torque curve 120 is carried out, and thereby torque for holding the rotor in the intersection 124 is generated. This corresponds to a case where only the first phase is excited. Next, when the step signal is inputted from the external, exchange of the torque curve from the curve 120 to the curve 4 is carried out. In case the step signal has been inputted before the arrival at the intersection 124, ordinary exchange of excitation from the curve 3 to the curve 4 is carried out.

By means of the above-mentioned operation, exchange of excitation is executed in synchronism with the step signal from the external and at the optimum timing. It is also possible to make the rotor stop in the desired rotational position.

According to the conventional art, signal lines for inputting command signals from such an external circuit as a microcomputer have been required to have the number of phases of the stepping motor other than common lines and power lines. However, in the driving method of the present invention, only two lines of the stepping signal and the directional command signal are indispensable.

In the above-mentioned embodiments, although the descriptions have been made about the four-phases motor in the bifilar windings and the two-phases motor in the monofilar windings, the present invention is applicable to a stepping motor of over four phases.

Besides, apart from the method of the above embodiment wherein a waiting state for the external commands is prepared after the exchange of the driving method from the ordinary two-phases excitation to the sinlephase excitation, a modified embodiment may be constituted as follows: In case where an inertia of the load is large and none of the command signal are inputted from the external in spite of the advance of the motor; the step advance signal of the motor is issued at every time when the excitation changing signals are detected at the respective intersections; and simultaneously, exchange of the torque curve is carried out in a manner that the waiting state in FIG. 8 is shifted from the torque curve 120 to the torque curve 3, and further, to the torque curve 121 at every time when the timings of the intersections 125, 126, . . . come along.

Further, apart from the above-mentioned embodiment wherein a square-wave is used for excitation, another embodiment may be such that the microstep excitation method, which is well known, is employed instead of the square-wave excitation method.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for driving a stepping motor having a plurality of phase windings, said method comprising the steps of:
   obtaining a timing signal for the electrification of a phase winding from a counterelectromotive voltage generated in each of said phase windings;
   obtaining a clock signal having a frequency which relies on a period of said timing signal; and
   determining a starting timing of an electrifying signal and a duration thereof.

2. A method for driving a stepping motor having a plurality of phase windings, said method comprising the steps of:
   obtaining a timing signal for the electrification of said phase windings from a respective counterelectromotive voltage generated in each of said phase windings;
   determining a start time for starting said electrification and an end time $T_2$ for ceasing said electrification, both start and end times being functions of a period of said timing signal; and
   electrifying each of said phase windings with a duration from said start time to said end time after generation of said timing signal.

3. A method for the open-loop driving of the rotor of a stepping motor having a plurality of phase windings and in response to selective electrical excitation of said phase windings, comprising the steps of:
   obtaining a timing signal for the electrification of said phase windings from a counterelectromotive voltage generated in each of said phase windings,
   determining a signal for electrifying each of said phase windings from said timing signal during acceleration, driving or deceleration of said rotor, and
   exciting each of said phase windings in response to said so-determined electrifying signal.

4. A method for driving a stepping motor having a plurality of phase windings, said method comprising the steps of:
   obtaining a timing signal for electrification of said phase windings from a counterelectromotive voltage generated in each of said phase windings and
   determining a signal for electrifying each of said phase windings, wherein
   a driving signal having a predetermined period is externally provided, and an excitation method of said phase windings is changed in the case where said driving signal is not renewed from the previous state at the time when said timing signal is generated or said signal for electrifying each of said phase windings is determined.

5. A method for driving a stepping motor in accordance with claim 4, wherein
   said excitation method effects a hold mode when said driving signal is not renewed from said previous state.

6. A method for driving a stepping motor in accordance with claim 4, wherein
   said excitation method is changed from a two-phases excitation to a single-phase excitation and effects a hold mode by said single-phase excitation when said driving signal is not renewed from said previous state.

7. A method for driving a stepping motor in accordance with claim 4, wherein
   said excitation method is changed from a n-phases excitation to a (n−m) phases excitation and effects a hold mode when said driving signal is not renewed from said previous state, wherein n and m are integers and hold a relation of m<n.

8. A method for driving a stepping motor in accordance with claim 4, wherein
   excitation of said stepping motor is effected by microstep excitation.

9. A method for driving a stepping motor in accordance with claim 4, wherein
   an interrupt signal to an external microcomputer is generated by said timing signal.

10. A method for driving a stepping motor having a plurality of bifilar phase windings, said method comprising the steps of:
    providing an electrification signal for each of said phase windings, the electrification signal having an ON phase-angle duration smaller than 180°, and
    determining the starting time for electrification and the ON duration thereof as a function of the change in polarity of a counter-electromotive voltage generated in each of said phase windings, said change in polarity being detected by comparing counter-electromotive voltages of said bifilar windings with each other during the non-ON duration of the electrification in each of said windings.

11. A driving method for driving a stepping motor having bifilar windings comprising the steps of:
    providing an electrification signal for each of said phase windings, the electrification signal having an ON phase-angle range smaller than 180°, and
    determining the starting time for electrification and the ON duration thereof as a function of the time when the counter-electromotive voltage generated in each of said phase windings are equal to each other during the non-ON duration of electrification in each of said phase windings.

12. A method for driving a stepping motor having a plurality of phase windings, said method comprising the steps of:
    providing an electrification signal for each of said phase windings, the electrification signal having an ON phase-angle duration smaller than 180°, and
    determining the starting time for electrification and the ON duration thereof as a function of the time when counterelectromotive voltages generated in said phase windings are equal to each other.

* * * * *